Patented Dec. 12, 1950

2,533,224

UNITED STATES PATENT OFFICE 2,533,224

POLYMERIC COMPOSITIONS AND METHODS OF PREPARING THE SAME

Arthur Cresswell, Stamford, Conn., assignor to American Cyanamid Company, New York, N. Y., a corporation of Maine No Drawing. Application September 4, 1947, Serial No. 772,201

16 Claims. (Cl. 260—30.8)

This invention relates to polymeric compositions and to a method of preparing the same. More particularly the invention relates to new and useful compositions of matter comprising (1) a thermoplastic product of polymerization of a polymerizable mass comprising mainly acrylonitrile and (2) a guanidine thiocyanate represented by the general formula I 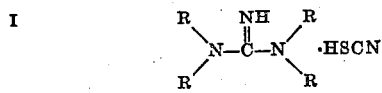

where each R represents a member of the class consisting of hydrogen and lower alkyl radicals, which may be the same or different, and at least two of which are hydrogen atoms. Illustrative examples of lower alkyl radicals, more particularly alkyl radicals containing from 1 to 5 carbon atoms, inclusive, which R may represent are methyl, ethyl, propyl, isopropyl, n-butyl, isobutyl, sec.-butyl, tert.-butyl, amyl, etc. The invention especially is concerned with solutions, e. g., aqueous solutions, alcoholic solutions, etc., of a thiocyanate of the kind embraced by Formula I in which is dissolved a thermoplastic product of polymerization of a polymerizable mass comprising mainly acrylonitrile, e. g., such a mass which comprises at least about 85% by weight of acrylonitrile. These solutions are particularly valuable for the casting of films of the polymeric or copolymeric acrylonitrile or as spinning solutions or extrudable compositions in forming filaments (both mono- and multifilaments), threads, yarns, bars, rods, tubes, etc. More specific examples of such solutions are solutions comprising polymeric acrylonitrile dissolved in an aqueous solution, more particularly a concentrated aqueous solution, of guanidine thiocyanate; and solutions containing a copolymer of at least about 85% by weight of acrylonitrile and the remainder a lower alkyl acrylate, e. g., methyl acrylate, dissolved in a solution of guanidine thiocyanate of the kind just mentioned.

Various methods of producing filaments, films and other shaped articles from polyacrylonitrile (polymeric acrylonitrile) and from copolymers or interpolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaternary ammonium compound, more particularly a pyridinium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metal) salts, e. g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in U. S. Patents 2,404,713–728.

The present invention is based on my discovery that polymers and copolymers of acrylonitrile, more particularly polymeric acrylonitrile and thermoplastic copolymers of acrylonitrile, e. g., copolymers of acrylonitrile and methyl acrylate, acrylonitrile and acrylamide, etc., are compatible with thiocyanates of the kind embraced by Formula I and are soluble in solutions, e. g., concentrated aqueous solutions, alcohol solutions, etc., of such thiocyanates, especially guanidine thiocyanate. The resulting solutions are suitable for use in making mono- and multifilaments, threads, yarns, bars, rods, tubes, etc., therefrom, for example by methods such as are described in my copending application Serial No. 772,200, filed concurrently herewith. The thiocyanate solution does not react with or decompose the polymer, and can be substantially completely removed from films, threads or other shaped bodies which are produced from it. The solution of the polymer is stable over a long period of time. Another advantage of solutions of thiocyanates of the kind embraced by Formula I as solvents for polymeric and copolymeric acrylonitrile as compared with similar solutions of inorganic thiocyanates, e. g., sodium thiocyanate, is that the polymeric solutions produced from the former tend to have a less corrosive action on metal structures (e. g., lines, tanks, etc.) with which they come in contact than those prepared from the latter.

It was quite unexpected and unpredictable that solutions (both solid and liquid) of guanidine thiocyanates of the kind embraced by Formula I would be effective solvents for polymers and copolymers (thermoplastic copolymers) of acrylonitrile, especially since solutions of other guanidine salts, e. g., a 60% aqueous solution of guanidine hydrochloride, will not dissolve polymeric acrylonitrile. It also was unobvious and could not be predicted that the guanidine thiocyanates with which the present invention is concerned would be compatible with polymeric acrylonitrile and thermoplastic copolymers thereof and that these polymeric materials could be dissolved in the molten thiocyanate to yield homogeneous solutions.

Guanidine thiocyanate is available on the open market. The mono- (lower alkyl) guanidine thiocyanates and the symmetrical and unsymmetrical di- (lower alkyl) guanidine thiocyanates used in practicing my invention may be produced, for instance, from the corresponding nitrates, which may be prepared by methods for the production of acid addition salts of substituted guanidines such as are disclosed and claimed in the copending application of Joseph H. Paden, Serial No. 735,023, filed March 15, 1947, and now abandoned. The guanidine thiocyanate is obtained, for example, by dissolving the corresponding nitrate in boiling ethanol and adding to the resulting solution a hot alcoholic solution of an equivalent amount of sodium thiocyanate. Sodium nitrate precipitates from the reaction mixture and is filtered off. The alcoholic solution of the thiocyanate is evaporated, yielding the substituted guanidine thiocyanate in crystalline form.

In carrying my invention into effect a polymer or copolymer (thermoplastic copolymer) of acrylonitrile is prepared in accordance with methods now well known to those skilled in the art. In the preparation of copolymers a mixture of monomers comprising mainly, that is a preponderant proportion by weight of, acrylonitrile is employed, and preferably the acrylonitrile constitutes at least about 85% by weight of the mixture of monomers. The monomeric mixture should contain substantially more than 50% by weight of acrylonitrile, e. g., from 55 to 99.5% by weight of acrylonitrile. Illustrative examples of monomers which may be copolymerized with acrylonitrile in proportions such as have been mentioned above to form a copolymer, more particularly a thermoplastic copolymer, are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; and numerous other vinyl, acrylic and other compounds containing a single $CH_2=C<$ grouping which are copolymerizable with acrylonitrile to yield thermoplastic copolymers. Alkyl esters of alpha,beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

A suitable method of polymerizing the monomeric acrylonitrile or mixture of monomers is in an aqueous emulsion using a suitable polymerization catalyst, e. g., ammonium persulfate. Other polymerization methods, however, also may be employed, e. g., methods such as those described in Bauer et al., U. S. Patent No. 2,160,054. The polymeric or copolymeric acrylonitrile may be of any suitable molecular weight, but ordinarily will be within the range of 15,000 to 300,000 or higher, as calculated from viscosity measurements by the Staudinger equation (reference: U. S. Patent No. 2,404,713).

The preferred compositions of the present invention are prepared by first forming a solution, e. g., a concentrated aqueous solution, of a thiocyanate of the kind embraced by Formula I and then adding thereto a polymer or copolymer of acrylonitrile such as has been described hereinbefore. Alcohol, e. g., monohydric or polyhydric alcohol, solutions which are capable of dissolving the polymeric or copolymeric acrylonitrile also may be employed. Depending upon the molecular weight of the polymeric material, the solvent used in dissolving the thiocyanate, the concentration of the thiocyanate in the chosen solvent and the concentration of the polymeric material therein, dissolution may be effected by stirring the mixed ingredients at temperatures ranging, for example, from room temperature (20° to 30° C.) to the boiling point of the solvent employed or of the mixture of solvent and guanidine thiocyanate. Ordinarily, when water is the solvent for the thiocyanate, dissolution is effected by heating a mixture of the polymeric or copolymeric acrylonitrile and a concentrated aqueous solution of the guanidine thiocyanate, with agitation, at a temperature of from about 50° to 100° C. until the polymeric material has dissolved in the solution.

The concentration of the polymerization product in the solution of the thiocyanate will depend, for example, upon such influencing factors as the molecular weight of the polymerization product, the particular thiocyanate and solvent therefor employed, the concentration of the thiocyanate in the solvent and the particular purpose for which the dissolved polymeric material is to be used.

The molecular weight of the polymerization product employed usually is within the range of 15,000 to 300,000, as calculated from viscosity measurements by the Staudinger equation, and advantageously is of the order of 35,000 or 40,000 to 140,000 or 150,000. The concentration of the polymer or copolymer may range, for example, from 7 to 8% up to 18 or 20% by weight of the solution containing the same. The viscosity of the thiocyanate solution (e. g., an aqueous thiocyanate solution) of the polymerization product, as determined by measuring the time in seconds for a ⅛-inch Monel metal ball to fall through 20 cm. of the solution at 61° C., may be, for instance, from 50 to 500 seconds. The best casting or spinning solutions from the standpoint of coagulation and the optimum properties of the precipitated gel are those which contain the highest concentration of polymer and the lowest concentration of a guanidine thiocyanate of the kind embraced by Formula I, which concentrations are consistent with solubility and viscosity limitations. The concentration of the guanidine thiocyanate in water or other solvent may be, for example, from 50 to 90%. Good results are obtained by using a concentration of 10 to 12% polymeric or copolymeric acrylonitrile in a 60 to 70% solution of the thiocyanate, specifically guanidine thiocyanate. The viscosity of the solution should not be so high that it is difficult to filter or to stir and de-aerate prior to use.

Various solvents in addition to water may be used to dissolve the thiocyanates used in practicing the present invention, for instance monohydric alcohols (e. g., methyl, ethyl, propyl, isopropyl, n-butyl, isobutyl, sec.-butyl, amyl, allyl, etc., alcohols), including alcohol-ethers, e. g., the monomethyl ether of ethylene glycol, etc.; polyhydric alcohols, e. g., ethylene glycol, diethylene glycol, triethylene glycol, glycerol, pentaerythritol, dipentaerythritol, sorbitol, mannitol, neopentyl glycol, dineopentyl glycol, trimethylol propane, trimethylol butane, 1,4-butanediol, etc.; and others.

In order that those skilled in the art better may understand how the present invention may be carried into effect, the following examples are given by way of illustration and not by way of limitation. All parts and percentages are by weight.

Example 1

To an aqueous solution of 792 parts of acrylonitrile in 8774 parts of water was added 914 parts of a 9.64% aqueous solution of acrylamide. The temperature of the solution was raised to 40° C. by means of a water bath, and then 20 parts of sodium metabisulfite was added with stirring, followed by 20 parts of ammonium persulfate while continuing the agitation. By controlling the surrounding bath temperature, the temperature of the reaction mixture was held to a maximum of 41.4° C. at the end of 12 minutes, after which the temperature again returned to 40° C. at the end of 30 minutes. The polymer slurry was stirred at 40° C. for a total of 2 hours, after which the polymer was filtered off, washed, dried and ball-milled.

A solution formed by dissolving 1 gram of the copolymer in 60% aqueous sodium thiocyanate to make 100 ml. at 20° C. had a viscosity of 17.7 centipoises at 40° C.

Ten parts of the copolymer was added to a solution of 58.5 parts of crystalline guanidine thiocyanate in 31.5 parts of water at 55° C. After stirring for 30 minutes almost all of the copolymer had dissolved and after 2 hours stirring at 55° C. no further undissolved particles were evident. The product was a clear, yellow, viscous solution. It is suitable for use in making films, filaments, threads, etc., therefrom by methods such as are described in my aforementioned copending application Serial No. 772,200.

Example 2

To a solution of 0.5 part of ammonium persulfate and 2 parts of sodium metabisulfite in 1067 parts of water at 40° C. was added dropwise over 2.5 hours a mixture of 163.4 parts of acrylonitrile and 18.1 parts of methyl acrylate. At the conclusion of the addition, the copolymer slurry was stirred at 40° C. for an additional 1.5 hours, after which the copolymer was filtered off, washed, dried and ball-milled.

A solution formed by dissolving 1 gram of the copolymer in 60% aqueous sodium thiocyanate to make 100 ml. at 20° C. had a viscosity of 23.65 centipoises at 40° C.

Ten parts of the copolymer was added to a solution of 58.5 parts of crystalline guanidine thiocyanate in 31.5 parts of water. The mixture was stirred at 65° C. for 60 minutes, forming a clear, yellow, viscous solution. After centrifugally de-aerating, a 0.004" thick smear was cast on a glass plate, and the film was coagulated by immersion in water at 2° C. The resulting film was clear, tough and ductile.

Example 3

To a solution of 3.3 parts of ammonium persulfate and 6.6 parts of sodium metabisulfite in 3530 parts of water at 40° C. was added dropwise over 2 hours 414 parts of acrylonitrile. The slurry was stirred further and then the polyacrylonitrile was filtered off, washed, dried and ball-milled.

A solution formed by dissolving 1 gram of the polymer in 60% aqueous sodium thiocyanate to make 100 ml. at 20° C. had a viscosity of 21.5 centipoises at 40° C.

Fifteen and seven-tenths parts of the polyacrylonitrile was added to a solution of 111.4 parts of crystalline guanidine thiocyanate in 30 parts of water at 60° C. The mixture was stirred for 2 hours, at the end of which time the polymer had dissolved to form a reddish-yellow, clear, viscous solution. Coagulated in water at 1° C., the solution formed a slightly hazy but tough and ductile film.

Example 4

Four and five-tenths parts of the same copolymer described in Example 2 was added to a solution of 54 parts of unsymmetrical diethyl guanidine thiocyanate in 6 parts of water at 100° C. Upon evaporating the water the mass became transparent and viscous, indicating compatibility of the thiocyanate with the copolymer. An acrylonitrile-methyl acrylate copolymer plasticized with unsymmetrical diethyl guanidine thiocyanate thereby is produced. The plasticized copolymer may be extruded or otherwise shaped into films, filaments, bristles, rods, tubes, etc. The modified copolymer may be extruded into water, alcohol or other solvent for the thiocyanate, which then is dissolved from the copolymer, e. g., either prior to or during stretching of the copolymer to orient its molecules and improve its properties.

Example 5

Four parts of the same copolymer described in Example 2 was added to a solution of 32.4 parts of unsymmetrical dimethyl guanidine thiocyanate in 3.6 parts of water at 90° C. With stirring the copolymer dissolved to form a viscous, yellow solution.

Example 6

One part of a copolymer of 10% acrylamide and 90% acrylonitrile was mixed with 17.6 parts of crystalline guanidine thiocyanate. This mixture was heated in an oil bath at 120° C.; gradually the guanidine thiocyanate melted (at about 116° C.) to a clear, pale yellow liquid. The mixture was stirred at 115° C. and within 5 minutes the copolymer had dissolved in the molten guanidine thiocyanate to form a clear, yellow, viscous solution. This was allowed to cool, and at 100–101° C. crystallization of the entire homogeneous melt set in. The solidified solution could again be remelted to form the clear, viscous solution.

To the melted solution was gradually added with stirring 9.5 parts of water, while holding the solution temperature at 105° C., yielding a clear, aqueous solution of the copolymer that remained fluid at room temperature.

In place of water, various liquid organic solvents such, for instance, as monohydric alcohols (e. g., methyl, ethyl, propyl, isopropyl, n-butyl, etc., alcohols) and polyhydric alcohols (e. g., ethylene glycol, diethylene glycol, glycerol, etc.) may be used to dissolve the melt.

Example 7

A mixture of 7.3 parts of crystalline guanidine thiocyanate, 4.86 parts of ethylene glycol and 1 part of a copolymer such as was used in Example 6 was heated in an oil bath at 110° C. with stirring. A clear, light yellow, viscous solution resulted. This solution remained fluid until approximately 80° C., at which temperature gelation started.

*Example 8*

A mixture of 10.2 parts of crystalline guanidine thiocyanate, 4.85 parts of ethanol and 1.75 parts of a copolymer such as was used in Example 6 was stirred at 90° C., yielding a clear, pale yellow, viscous solution. On cooling this solution became increasingly viscous until it crystallized at approximately 50° C.

The compositions of Examples 5 to 8, inclusive, may be made into films, filaments, etc., by methods such as are described in my copending application Serial No. 772,200.

The polymers and copolymers of acrylonitrile used in practicing the present invention may be precipitated from a solution thereof in a concentrated solution of a thiocyanate (or mixture of thiocyanates) of the kind embraced by Formula I by, for example, water or other aqueous solutions. For reasons given in my aforementioned copending application Serial No. 772,200 the coagulating bath of water or other aqueous solution preferably is at a temperature not substantially exceeding +10° C., e. g., at −15° C. to 0° C. or slightly thereabove. The thiocyanate readily dissolves in the water, leaving the polymerization product in gel state and substantially free from thiocyanate. The gelled material, e. g., in the form of an extruded, water-swollen filament is materially improved in properties by subjecting the precipitated material in wet, swollen state to tension, as by stretching, in contact with moisture or water and at an elevated temperature, specifically at a temperature within the range of about 70° C. to about 110° C. Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam may be employed. By thus wet stretching the precipitated polymerization product as more fully described in my aforementioned copending application Serial No. 772,200, the molecules are oriented along the fiber axis and a product having increased tensile strength, pronounced fibrillation, toughness, resilience and other improved properties is obtained.

The water-swollen filaments or other bodies may be dyed with an acetate dye as more fully described in my copending application Serial No. 772,202, filed concurrently herewith. The gel life of such bodies may be prolonged by treatment with an aqueous solution of a humectant; e. g., a polyhydric alcohol, likewise as more fully described in my aforementioned copending application Serial No. 772,202.

The normally solid and liquid (e. g., aqueous) compositions of this invention may be modified with various modifying agents in order better to adapt them for a particular service use. Examples of such modifying agents are proteins (e. g., zein, casein, gelatin, etc.), dyes, pigments, lubricants, cellulosic and other fillers, etc.

I claim:

1. A composition of matter comprising (1) a thermoplastic product of polymerization of a polymerizable mass comprising mainly acrylonitrile and (2) a guanidine thiocyanate represented by the general formula

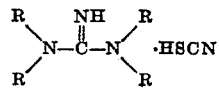

where each R represents a member of the class consisting of hydrogen and lower alkyl radicals containing from 1 to 5 carbon atoms, inclusive, and at least two of which substituents represented by R are hydrogen atoms.

2. A composition of matter comprising polymeric acrylonitrile and a guanidine thiocyanate represented by the general formula

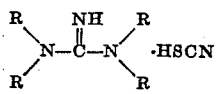

where each R represents a member of the class consisting of hydrogen and lower alkyl radicals containing from 1 to 5 carbon atoms, inclusive, and at least two of which substituents represented by R are hydrogen atoms.

3. A composition as in claim 1 wherein the thiocyanate is guanidine thiocyanate.

4. A composition as in claim 1 wherein the thiocyanate is unsymmetrical dimethyl guanidine thiocyanate.

5. A composition as in claim 1 wherein the thiocyanate is unsymmetrical diethyl guanidine thiocyanate.

6. A composition of matter comprising (1) a thermoplastic product of polymerization of a polymerizable mass comprising at least about 85% by weight of acrylonitrile, any other comonomer which is present in the said polymerizable mass in addition to the said acrylonitrile being a monomeric material which is copolymerizable with the said acrylonitrile to yield a thermoplastic polymerization product, and (2) a solvent for the product of (1) comprising guanidine thiocyanate.

7. A solution containing a thermoplastic product of polymerization of a polymerizable mass comprising at least about 85% by weight of acrylonitrile dissolved in a solution of guanidine thiocyanate, any other comonomer which is present in the said polymerizable mass in addition to the said acrylonitrile being a monomeric material which contains the polymerizable grouping $CH_2\!=\!C\!<$ and which is copolymerizable with the said acrylonitrile to yield a thermoplastic polymerization product.

8. Polymeric acrylonitrile dissolved in a concentrated aqueous solution of guanidine thiocyanate.

9. A composition adapted for the production of films, filaments, threads, rods, tubes and the like comprising a concentrated aqueous solution of guanidine thiocyanate having dissolved therein a thermoplastic product of polymerization of a polymerizable mass comprising mainly acrylonitrile, any other comonomer which is present in the said polymerizable mass in addition to the said acrylonitrile being a monomeric material which is copolymerizable with the said acrylonitrile to yield a thermoplastic polymerization product.

10. An extrudable composition comprising a concentrated aqueous solution of guanidine thiocyanate having dissolved therein a thermoplastic product of polymerization of a polymerizable mass comprising at least about 85% by weight of acrylonitrile, any other comonomer which is present in the said polymerizable mass in addition to the said acrylonitrile being a monomeric material which contains a $CH_2{=}C{<}$ grouping and which is copolymerizable with the said acrylonitrile to yield a thermoplastic polymerization product.

11. A solution containing a copolymer of at least about 85% by weight of acrylonitrile and the remainder methyl acrylate, said copolymer being dissolved in an aqueous solution of guanidine thiocyanate.

12. The process of producing a composition adapted for the production of films, filaments, threads, rods, tubes and the like which comprises dissolving a thermoplastic product of polymerization of a polymerizable mass comprising mainly acrylonitrile in a guanidine thiocyanate represented by the general formula

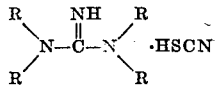

where each R represents a member of the class consisting of hydrogen and lower alkyl radicals containing from 1 to 5 carbon atoms, inclusive, and at least two of which substituents represented by R are hydrogen atoms.

13. The process of producing a solution of a thermoplastic product of polymerization of a polymerizable mass comprising at least about 85% by weight of acrylonitrile, any other comonomer which is present in the said polymerizable mass in addition to the said acrylonitrile being a monomeric material which contains the polymerizable grouping $CH_2{=}C{<}$ and which is copolymerizable with the said acrylonitrile to yield a thermoplastic polymerization product, said process comprising heating a mixture of the said polymerization product and a concentrated solution of guanidine thiocyanate dissolved in a liquid solvent, with agitation, at a temperature of from about 20° C. to the boiling point of the said solution until the said polymerization product has dissolved in the said solution.

14. The process of producing a solution of a polymer of acrylonitrile which comprises heating a mixture of the said polymer and a concentrated aqueous solution of guanidine thiocyanate, with agitation, at a temperature of from about 50° C. to 100° C. until the said polymer has dissolved in the said solution.

15. A composition of matter comprising (1) a copolymer obtained by polymerization of a mixture of monomers comprising a preponderant proportion, by weight of the said mixture, of acrylonitrile and the remainder of the said mixture being monomeric substance containing the polymerizable grouping $CH_2{=}C{<}$ and which is copolymerizable with the said acrylonitrile to yield a thermoplastic copolymer, and (2) a guanidine thiocyanate represented by the general formula

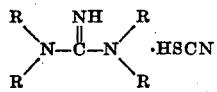

where each R represents a member of the class consisting of hydrogen and lower alkyl radicals containing from 1 to 5 carbon atoms, inclusive, and at least two of which substituents represented by R are hydrogen atoms.

16. A solution containing a copolymer of at least about 85% by weight of acrylonitrile and the remainder acrylamide, said copolymer being dissolved in an aqueous solution of guanidine thiocyanate.

ARTHUR CRESSWELL.

No references cited.